(12) United States Patent
Naccache

(10) Patent No.: US 9,697,511 B2
(45) Date of Patent: Jul. 4, 2017

(54) METHOD FOR SECURING TRANSACTIONS, TRANSACTION DEVICE, BANK SERVER, MOBILE TERMINAL, AND CORRESPONDING COMPUTER PROGRAMS

(75) Inventor: David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 607 days.

(21) Appl. No.: 12/643,352

(22) Filed: Dec. 21, 2009

(65) Prior Publication Data

US 2010/0198725 A1  Aug. 5, 2010

(30) Foreign Application Priority Data

Dec. 22, 2008  (FR) ...................................... 08 58969

(51) Int. Cl.
*G06Q 20/32* (2012.01)
*G06Q 20/10* (2012.01)
(Continued)

(52) U.S. Cl.
CPC ......... *G06Q 20/3224* (2013.01); *G06Q 20/10* (2013.01); *G06Q 20/105* (2013.01);
(Continued)

(58) Field of Classification Search
CPC ........................ G06Q 20/4016; G06Q 20/3224
(Continued)

(56) References Cited

U.S. PATENT DOCUMENTS

2003/0135463 A1  7/2003  Brown et al.
2003/0169881 A1  9/2003  Niedermeyer
(Continued)

FOREIGN PATENT DOCUMENTS

CN  1653472 A  8/2005
CN  101281670 A  10/2008
(Continued)

OTHER PUBLICATIONS

French Search Report and Written Opinion dated Aug. 20, 2009 for corresponding French Application No. FR 0858969, filed Dec. 22, 2008.

(Continued)

*Primary Examiner* — Eric T Wong
(74) *Attorney, Agent, or Firm* — David D. Brush; Westman, Champlin & Koehler, P.A.

(57) ABSTRACT

A method for securing a transaction by an electronic card paired with at least one mobile terminal, wherein a banking organization in charge of managing transactions involving the card has previously recorded an identifier of the mobile terminal among data relating to the owner of the card. The securing method includes: transmission, by the mobile terminal, of at least one first signal including a message containing the identifier; receipt, by at least one transaction device near the mobile terminal, of the first signal; transmission, by the transaction device, of a second signal including at least the message to at least one remote banking organization; assignment, by a control server of the banking organization, to a transaction involving the electronic card, by a control server of the banking organization, of information representing proximity between the electronic card and the mobile terminal, according to the second signal received by the banking organization.

5 Claims, 3 Drawing Sheets

(51) Int. Cl.
    *G06Q 20/20*   (2012.01)
    *G06Q 20/22*   (2012.01)
    *G06Q 20/40*   (2012.01)

(52) U.S. Cl.
    CPC ........... *G06Q 20/20* (2013.01); *G06Q 20/223* (2013.01); *G06Q 20/32* (2013.01); *G06Q 20/322* (2013.01); *G06Q 20/327* (2013.01); *G06Q 20/40* (2013.01)

(58) Field of Classification Search
    USPC .......................................................... 705/39
    See application file for complete search history.

(56) References Cited

U.S. PATENT DOCUMENTS

| | | | | |
|---|---|---|---|---|
| 2003/0182194 | A1* | 9/2003 | Choey et al. | 705/16 |
| 2006/0055552 | A1* | 3/2006 | Chung et al. | 340/686.1 |
| 2006/0237531 | A1* | 10/2006 | Heffez et al. | 235/382 |
| 2008/0076431 | A1* | 3/2008 | Fletcher et al. | 455/440 |
| 2009/0187492 | A1* | 7/2009 | Hammad et al. | 705/26 |
| 2012/0244885 | A1* | 9/2012 | Hefetz | G06Q 20/32 455/456.2 |

FOREIGN PATENT DOCUMENTS

| | | |
|---|---|---|
| EP | 1286285 A | 2/2003 |
| WO | 03067506 A | 8/2003 |
| WO | 03098525 A | 11/2003 |
| WO | 2004079499 A | 9/2004 |
| WO | 2005073934 A | 8/2005 |

OTHER PUBLICATIONS

Partial English translation of Chinese Office Action dated Jun. 3, 2015 for corresponding Chinese Application No. 201010220936.7.
French Written Opinion on the Patentability of the Invention dated Dec. 22, 2008 for corresponding French Application No. FR0858969.

* cited by examiner

METHOD FOR SECURING TRANSACTIONS, TRANSACTION DEVICE, BANK SERVER, MOBILE TERMINAL, AND CORRESPONDING COMPUTER PROGRAMS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of transactions performed by means of a transaction device, for example an electronic payment terminal or an automatic cash dispenser.

More specifically, the disclosure relates to the improvement of the securing and traceability of such transactions.

BACKGROUND OF THE DISCLOSURE

A classic transaction securing technique consists of authenticating the electronic card involved in the transaction by means of a personal code known to the carrier of said card, for example a 4-digit code. Such a technique is not however completely reliable, insofar as said code can be discovered, for example by observation when the code is entered at the time of a transaction, or by searching by means of a program, in order to use the cart stolen from its carrier.

To overcome these disadvantages, there are techniques enabling the safety of transactions to be reinforced, by adding in particular a phase of biometric authentication of the card carrier, for example by obtaining fingerprints, by voice recognition, and so on.

However, these techniques are expensive to use, due to the implementation of a biometric sensor, they are less user-friendly, as the user must provide a biometric fingerprint, and they make the transactions more complex and in particular more time-consuming.

SUMMARY

An aspect of the disclosure relates to a method for securing a transaction by means of an electronic card.

According to an exemplary aspect of the disclosure said electronic card is paired with at least one mobile terminal, wherein the banking organization in charge of the management of transactions involving said card has previously recorded an identifier of said mobile terminal among the data relating to the owner of said card, and such a securing method includes the following steps:
  transmission, by said mobile terminal, of at least one first signal including a message containing said identifier;
  receipt, by at least one transaction device near said mobile terminal, of said first signal;
  transmission, by said transaction device, of a second signal including at least said message to at least one remote banking organization;
  assignment, by a control server of said banking organization, to a transaction involving said electronic card, of information representing the proximity between said electronic card and said mobile terminal, according to said second signal received by said banking organization.

Thus, an exemplary aspect of the disclosure is based on a novel and inventive approach to the securing of transactions, which uses the proximity between a mobile terminal, typically a portable telephone, of an electronic card carrier and a transaction device in order to add an additional factor for securing the transaction.

Indeed, if the mobile terminal of the carrier of the electronic card involved in the transaction is near the transaction device during the transaction, or within a short time period before or after the transaction, it is likely that the transaction has actually been performed by the card carrier.

If, instead, a bank card has been stolen and is being used by the theft, the mobile terminal of the card carrier is generally not close to the transaction device, and the transaction can then be marked as "suspicious".

According to an exemplary aspect of the disclosure, the securing method includes the following steps:
  determination of a distance between a position of said mobile terminal and said transaction device, by means of said information representing the proximity between said electronic card and said mobile terminal;
  rejection of said transaction and/or emission of an alert if said distance is greater than a predetermined threshold.

Thus, if the control server of the banking organization determines that the mobile terminal of the carrier of the card involved in the transaction was not in a predetermined area of proximity to the transaction device, or was instead in an area very far from the transaction device, the banking organization can emit an alert to the card carrier, for example a telephone call to request confirmation of the validity of the transaction.

In particular, said predetermined threshold is dependent on the time that has passed since said information representing the proximity was determined.

Indeed, the acceptable distance may be variable, according to the time at which the proximity information is determined, with respect to the time of the transaction.

For example, if the banking organization has received a signal from a transaction device indicating the presence of the mobile terminal of a user in a location X, and a transaction takes place 30 minutes later, in a location Y two kilometers away, the control server of the banking organization must take into account the time that has passed (i.e. 30 minutes) in order to determine the threshold to be applied. Indeed, in 30 minutes, the user may have traveled the two kilometers.

Moreover, if the transaction takes place several hours after receipt of the signal by the banking organization, the control server may consider the proximity information that is has determined to be expired, in view of the time that has passed.

Furthermore, each time the mobile terminal of the card carrier is near a transaction device implementing an aspect of the disclosure, it transmits a signal to the server of the banking organization enabling the mobile terminal to be located. The server of the banking organization determines new location information of the mobile terminal, and updates the current information, so as to be capable at any time of determining information representing the most recent proximity possible.

According to a specific feature of the disclosure, said message includes at least one bank reference information and at least one addressing information designating said banking organization.

Thus, the message transmitted by the mobile terminal contains not only an identifier of said terminal, so that the device can identify it (in order to respond to it, or to transmit said information to the banking organization), but also information representing the bank account of the carrier of the terminal and the associated card, and of the banking organization to which the transaction device will transmit the second signal.

For example, the message can contain a bank account number, or an electronic card number associated with a bank account, and a telephone number or an email address of the banking organization in charge of management of said bank account.

In this way, the transaction device knows the recipient (banking organization) of the signal that it transmits in order to indicate a location of the mobile terminal that has been identified to it.

According to an exemplary aspect of the disclosure, said first signal is transmitted according a communication technique belonging to the group including:
"Bluetooth" technology;
"Wi-Fi" technology;
"RFID" technology;
"NFC" ("Near Field Communication") technology;
infrared technology.

Thus, according to various exemplary embodiments of the disclosure, the communication between the transaction device and the mobile terminal is implemented via different technologies, varying for example according to the type of mobile terminal involved.

The disclosure also relates to a transaction device capable of implementing a transaction by means of an electronic card.

According to an exemplary aspect of the disclosure, said electronic card is paired with at least one mobile terminal, wherein the banking organization in charge of the management of transactions involving said card has previously recorded an identifier of said mobile terminal among the data relating to the owner of said card, and said device includes:
means for receiving, from said mobile terminal, at least one first signal including a message containing said identifier;
means for transmitting a second signal including at least said message to at least one banking organization.

Such a transaction device is in particular suitable for implementing the steps of the securing method as described above. Such a device is, for example, an electronic payment terminal, or an automatic cash dispenser.

Another aspect of the disclosure relates to a banking server in charge of managing a transaction involving an electronic card, wherein said electronic card is paired with at least one mobile terminal, including:
means for recording an identifier of said mobile terminal among the data relating to the owner of said card;
means for receiving, from a transaction device, at least one signal including a message containing said identifier;
means for determining, in a transaction involving said electronic card, information representing the proximity between said electronic card and said mobile terminal.

Such a bank server is in particular suitable for implementing the steps of the securing method as described above.

The disclosure also relates to a mobile terminal including means for transmission, to at least one transaction device, of at least one signal including a message containing an identifier.

Such a mobile terminal is in particular capable of implementing the steps of the securing method as described above. Such a terminal is, for example, a portable telephone, or a PDA.

Finally, the disclosure relates to a computer program downloadable from a communications network and/or recorded on a computer-readable medium and/or capable of being run by a processor, including program code instructions for implementation of the securing method described above, when it is executed on a transaction device.

The disclosure also relates to a computer program downloadable from a communications network and/or recorded on a computer-readable medium and/or capable of being run by a processor, including program code instructions for implementation of the securing method described above, when it is executed on a mobile terminal.

Finally, the disclosure relates to a computer program downloadable from a communications network and/or recorded on a computer-readable medium and/or capable of being run by a processor, including program code instructions for implementation of the securing method described above, when it is executed on a bank server.

BRIEF DESCRIPTION OF THE DRAWINGS

Other features and advantages will become clearer in view of the following description of a specific embodiment, provided as a simple illustrative and non-limiting example, and appended drawings, in which.

DETAILED DESCRIPTION OF ILLUSTRATIVE EMBODIMENTS

1. General Principle of an Exemplary Aspect of the Disclosure

The general principle of an exemplary aspect of the disclosure is based on the locating of a mobile terminal associated with the carrier of an electronic card involved in bank transactions, so as to assess the proximity between the carrier of the card, via his/her mobile terminal, and the card itself, at the time of a transaction.

This proximity information is determined by the server of the banking organization in charge of the management of transactions involving the electronic card in question, and enables an additional factor for securing said transactions to be added.

Indeed, a large distance between the carrier of the card and the card, at the time of a transaction, can alert the bank server and enable additional transaction verification actions to be implemented (call to the card carrier before validation of the transaction, emission of an alert blocking the transaction at the level of the transaction device, etc.).

2. Description of a First Embodiment

Figure 1:
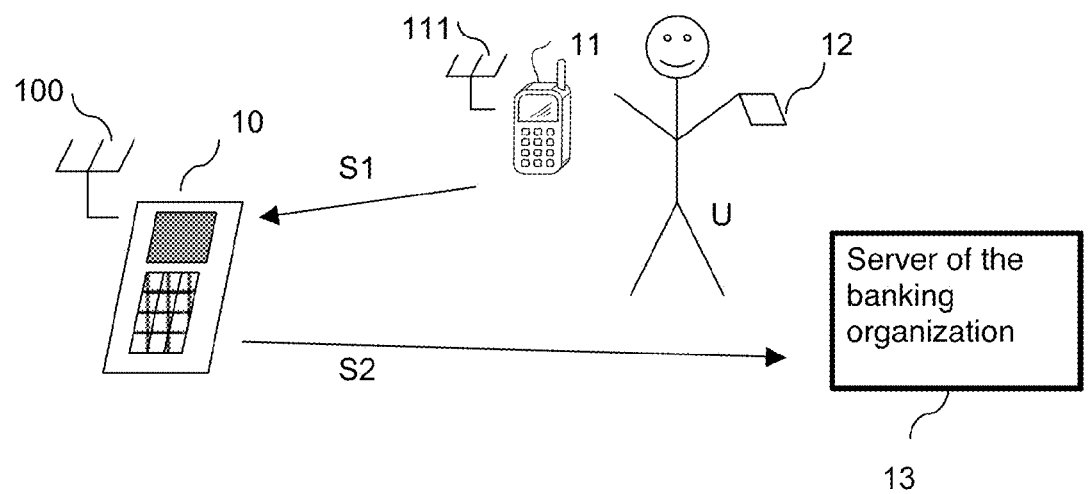
FIG. 1 shows an example of a system for implementing an aspect of the disclosure according to an embodiment.

FIG. 1 shows an example of a system for implementing an aspect of the disclosure, according to a first embodiment.

A transaction device 10 is considered, for example an electronic payment device, near which a user U is located, carrying a mobile terminal 11, including at least one transmission antenna 111, and an electronic card 12.

The bank account of said user U, and in particular the transactions performed via the electronic card 12, is managed by a banking organization, which has a server 13 storing the information relating to the transactions, also called the control server.

According to this embodiment, the transaction device 10 is capable of communicating with the mobile terminal 11 of the user U, for example a mobile telephone, and in particular of receiving and processing a signal S1 transmitted by it when the user U is nearby.

The transaction device 10 is also capable, according to this embodiment, of transmitting a second signal S2 to the server 13 of the banking organization, after receipt of the signal S1.

Figure 2:
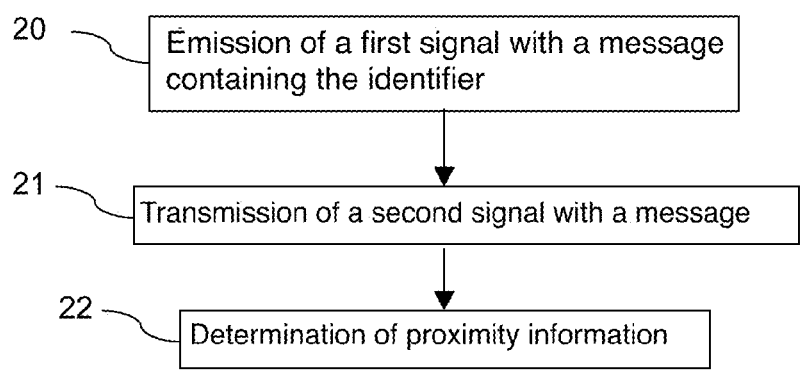
FIG. 2 shows the main steps of the securing method according to a first embodiment of the disclosure, in a system as shown in FIG. 1.

In reference to FIG. 2, the main steps of the securing method will now be described according to this first embodiment, implemented in a system as described above in reference to FIG. 1.

When the user U passes near the transaction device 10, the mobile terminal 11 of the user U transmits, in a step 20, a first signal S1, including a message containing in particular an identifier of the mobile terminal 11. For example, this identifier can be a call number enabling the mobile terminal to be identified, or a serial number of the memory card, and so on.

This signal S1 is received and processed by the transaction device 10, which then emits, in a step 21, a second signal S2, including a message containing the identifier of the mobile terminal 11, intended for the server 13 of the banking organization.

According to this embodiment, the server 13 of the banking organization receives and processes this signal S2, so as to extract information therefrom enabling the mobile terminal 11 of the user U carrying the card 12 to be located at a given time.

In a step 23, at the time of a transaction (or after a transaction according to an exemplary aspect of the disclosure), the control server 13 determines, by means of classic transaction information and information extracted from the signal S2, information on the proximity between the carrier U of the card 12 and the card 12 itself, at the time of the transaction. This proximity information enables, for example, the carrier of the card to be alerted when a transaction is suspicious due to a large distance separating the mobile terminal of the carrier U of the card 12, at the time of the transaction.

3. Description of a Second Embodiment

In reference to FIG. 3, the main steps of the method for securing a transaction will now be described according to a second embodiment of the disclosure, as well as the steps relating to the transaction itself.

As shown in FIG. 1, a user U is considered, carrying an electronic card 12 and a mobile telephone 11. The transactions involving the electronic card 12 are managed by a server 13 of a banking organization.

The mobile terminal 11 of the user U is capable of implementing the method according to this embodiment, and an identifier ID of this mobile terminal is pre-recorded, in a step 30, with the server 13, in association with information relating to the electronic card 12.

For example, a call number, or a serial number, or an identification code, corresponding to the mobile terminal 11, is recorded by the server 13 and associated with the information relating to the electronic card, such as the account number with which it is associated, its identification code, the contact information of the owner, and so on.

Moreover, it is considered that a number n of transaction devices $D_i$ are capable of implementing the method according to this embodiment, and are distributed in a plurality of stores (for example, electronic payment terminals), restaurants (for example, electronic payment terminals), malls (For example, automatic cash dispensers), and so on.

Thus, each time the carrier of the mobile terminal 11, pre-recorded with the bank server, is located near one of these devices $D_i$, it transmits a signal S1 to said device $D_i$ (step 20).

Indeed, according to this embodiment, the mobile terminal 11 detects a device $D_i$ nearby and sends it the signal S1.

According to an alternative embodiment, it is the device $D_i$ that detects the mobile terminal 11, and sends it a message requesting a response including an identifier. The mobile terminal then transmits the signal S1 in response to said request from the transmission device $D_i$.

This signal S1 can be transmitted via various short-range communications technologies, such as, for example, "Bluetooth", "Wi-Fi", "RFID", "NFC" ("Near Field Communication"), or infrared technology.

This first signal S1 includes a message containing in particular the identifier ID of the mobile terminal 11. This signal S1 can also include information enabling the banking organization to be identified, and more specifically the control server 13, in view of the subsequent emission of a signal from the device $D_i$ to said server.

For example, the message of the signal S1 can also contain an email address for accessing the control server 13, or a URL for transmitting information to the server, and so on.

The device $D_i$ receives and processes this signal, and then emits, in a step 21, a signal S2, to the control server 13. This signal S2 includes a message also containing the identifier ID. In addition, this signal S2 also includes identification information of the transaction device $D_i$, in particular so as to enable the mobile terminal 11 to be located, as well as timestamp information enabling the time of the location of the mobile terminal 11 to be determined.

This signal S2 can be emitted in the form of an SMS, a telephone call or an email message.

This signal S2 is received and processed by the control server 13 of the banking organization. For example, the server records the message contained in the signal S2, for subsequent processing, or directly extracts the useful information therefrom, so as to record it for subsequent use. The useful information is, for example, the identifier ID of the mobile terminal 11, the identification information of the device $D_i$, the location time, and so on.

When the control server successively receives a plurality of signals relating to the location of the same mobile terminal 11, i.e. when the steps described above are implemented for various transaction devices $D_i$, the control server updates the corresponding information. For example, it updates the identification information of the device $D_i$, as well as the time of the associated location. In this way, the control server preserves the most recent location information, for a given mobile terminal.

When the electronic card 12 is involved in a transaction, for example with a transaction device $D_m$, the exchanges relating to this transaction are classically as follows:

- a step 31 of authentication of the card 12 involved in the transaction, by means of a personal identification code PIN provided by the card carrier. The information concerning the card and the identification code are transmitted via a first telephone network to the server of the banking organization 13;
- a step 32 of verification, by the banking organization 13, of the conditions under which the transaction is performed, namely, for example, the amount available in the account of the client identified beforehand. The result of the verification is transmitted to the transaction device $D_m$, via the first telephone network;
- a step 33 of transmitting the debit data, by the transaction device $D_m$ to the server of the banking organization 13, again via the first telephone network;
- a step 34 of confirming the transaction;
- a step 35 of recording the data relating to the transmission, in a database of the bank server 13.

It will be considered here that the transaction device $D_m$ is not capable of implementing the securing method according to an exemplary aspect of the disclosure. Consequently, it does not transmit the signal S2, intended for the control server of the banking organization, in order to locate the mobile terminal 11 of the carrier of the electronic card 12, at the time of the transaction.

It is also considered that the securing method is implemented at the time of the transaction, by the control server 13 of the banking organization, so as to validate this transaction, or emit an alert, by a call to the mobile terminal 11 of the carrier U of the card 12.

For example, step 22 of determining information on the proximity between the mobile terminal of the carrier of the card and the card itself can be implemented after the classic step 32 of verifying the conditions under which the transaction is carried out.

Thus, when the server becomes aware of a transaction involving the card 12, it determines, on the basis of stored information relating to the card 12, and the most recent location information received from a transaction device $D_i$, proximity information. For example, information representing the distance between the most recent location of the mobile terminal 11 and the transaction device $D_m$ is calculated by the server.

This distance is compared to a predetermined threshold, so as to decide whether or not the transaction is "suspicious". This comparison also takes into account the time of the most recent location of the mobile terminal 11 and the time of the transaction, so as to be capable of determining whether the carrier of the mobile terminal 11 might have had the time to travel said distance.

For example, if the distance calculated is greater than this threshold, it is deduced that the mobile terminal, assumed to be carried by the card carrier, is not near the transaction device $D_m$. It is then possible that the card carrier and owner does not have his/her mobile terminal on him/her. It is possible, however, that the carrier of the card is not the owner of the card (and therefore not the carrier of the mobile terminal 11) but a person who has stolen said card and is seeking to use it.

If the distance is greater than the predetermined threshold, the transaction is not validated and an alert is emitted, in step 36. This alert consists, for example, of contacting the mobile terminal 11, so as to ensure that the transaction has indeed been performed by the owner of the card and the carrier of the mobile terminal.

If the distance is shorter than the threshold, the transaction is validated and the next steps (33 to 35) are implemented.

According to an alternative of this embodiment, it is considered that the transaction device $D_m$ is capable of implementing the securing method according to an exemplary aspect of the disclosure. At the time of the transaction, or shortly before it, if the mobile terminal 11 of the carrier of the card is located near the transaction device $D_m$, then it receives a first signal S1, from the mobile terminal 11. The transaction device $D_m$ then transmits a second signal S2, to the control server 13, so as to transmit location information of the mobile terminal 11, at the time of the transaction.

The control server 13 then determines the proximity information with information (relating to the transaction and extracted from the message S2) coming from the same transaction device $D_m$, and can therefore conclude that the mobile terminal 11 is indeed near the transaction device $D_m$ at the time of the transaction.

However, if the electronic card has been stolen and the carrier of the card does not have the mobile terminal 11 of the card owner, the transaction device $D_m$ does not transmit a signal S2 to the control server 13, which then uses the stored information, if it exists and is valid, on the most recent location of the mobile terminal 11 in order to determine the proximity information.

According to another alternative, the control server can consider the transaction to be suspicious when it has not received, before or during the transaction, location information for the transaction device $D_m$, knowing that it is capable of implementing an aspect of the disclosure.

4. Description of a Third Embodiment

Figure 4:
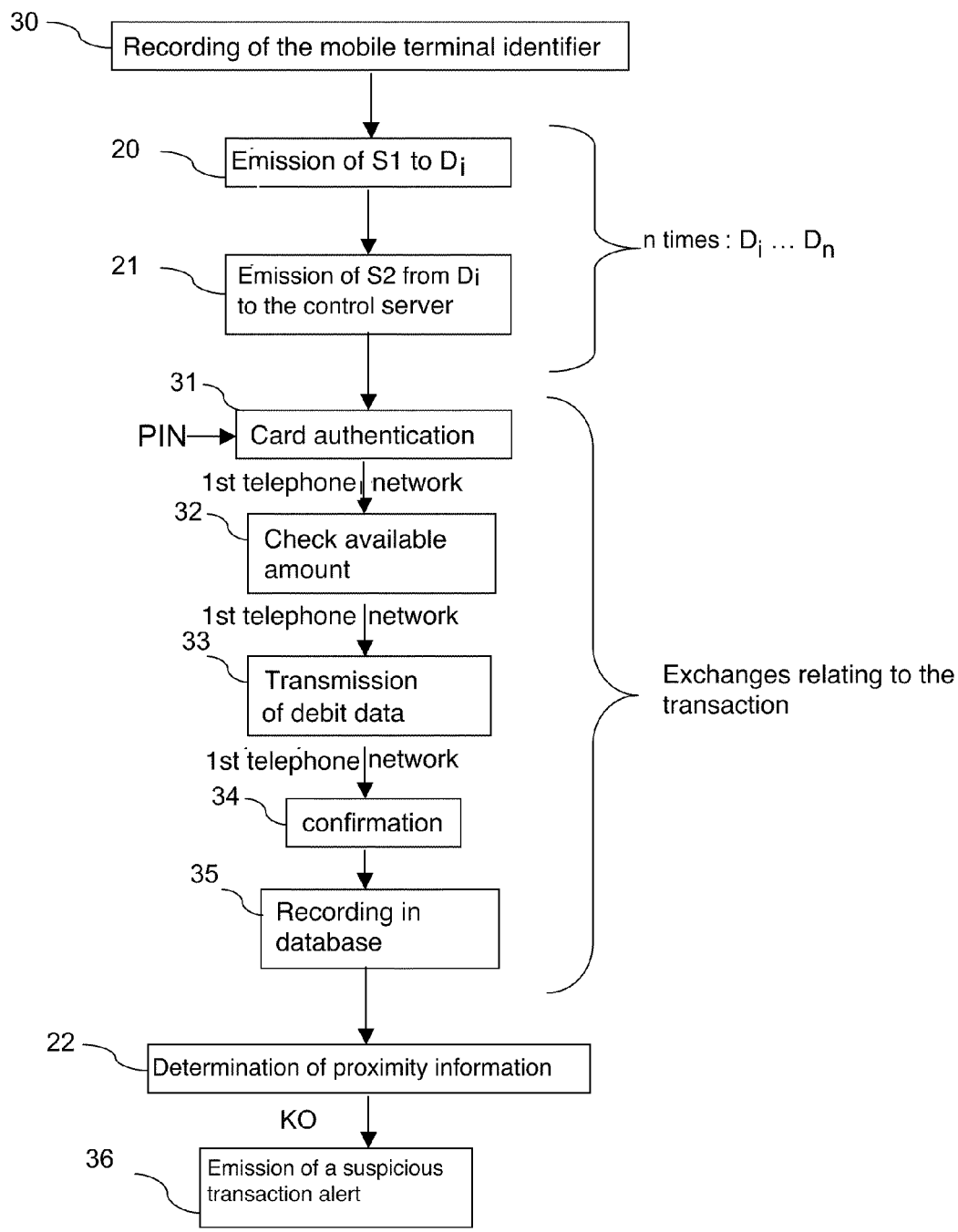
FIG. 4 shows the main steps of a transaction according to a third embodiment of the disclosure.

In reference to FIG. 4, the main steps of the method for securing a transaction will now be described according to a third embodiment of the disclosure, as well as the steps relating to the transaction itself.

Figure 3:
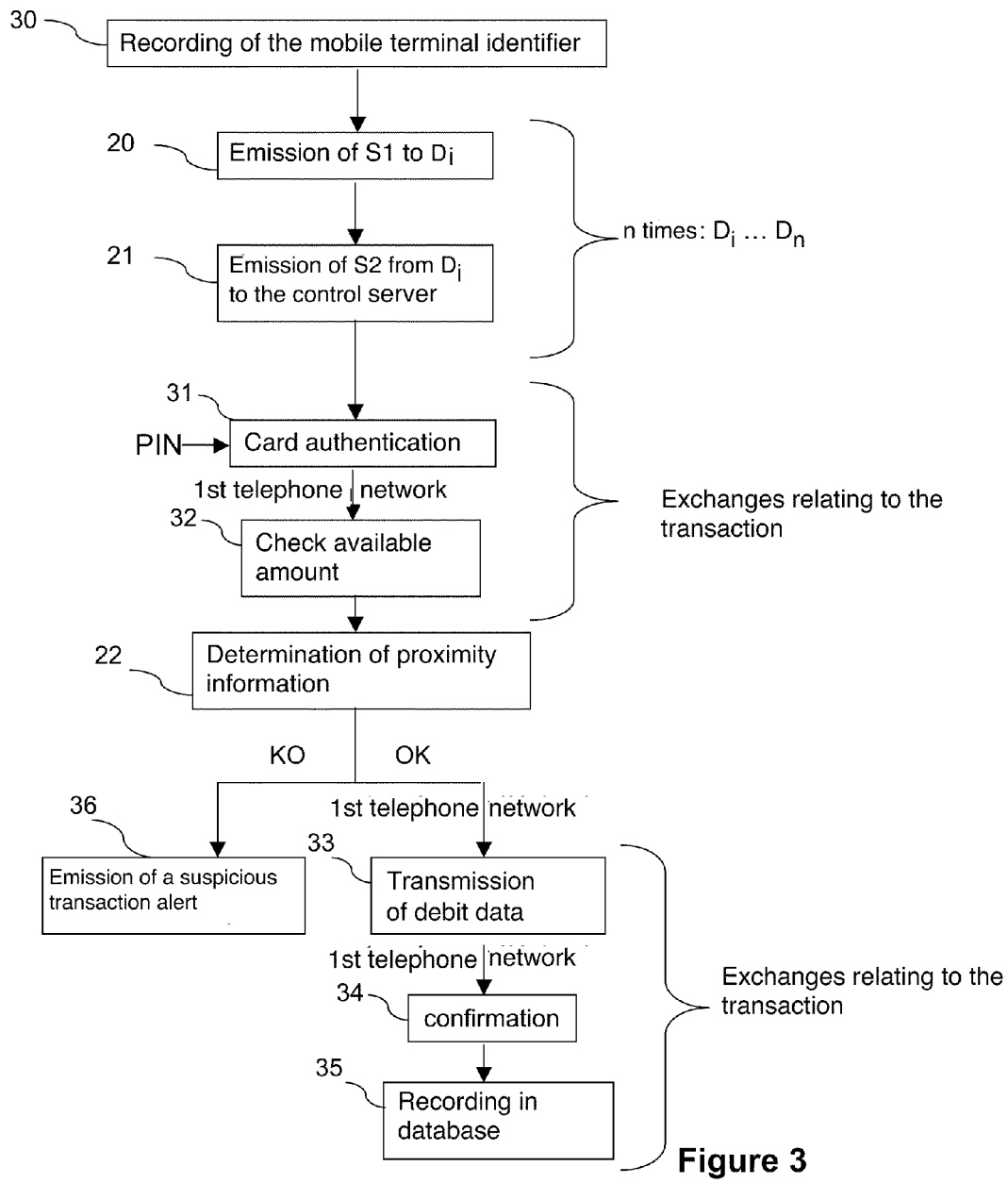
FIG. 3 shows the main steps of a transaction according to a second embodiment of the disclosure.

This embodiment is practically identical to that described in reference to FIG. 3 (the steps of this embodiment therefore are not described again), with the exception of step 22 of determining the proximity information, which is performed after the transaction, and not during it.

Thus, the transaction takes place in the usual manner, and the control server implements step 22 afterward, for example each evening in order to check the transactions carried out during the day, and the alert step 36 if necessary.

This embodiment makes it possible not to prolong the transaction time, with an additional verification, but still enables "suspicious" transactions to be detected and enables the owner of the card involved to be alerted.

The alert can then be provided in a form other than a telephone call, such as, for example, an urgent email message or an SMS.

At least one embodiment of the disclosure provides a technique enabling the securing and authentication of transactions to be reinforced.

In particular, an embodiment of the disclosure provides such a technique that does not require any additional operations or actions by the user, in particular during the transaction.

An embodiment of the disclosure provides such a technique that is not restrictive or imperative for validation of a transaction.

Although the present disclosure has been described with reference to one or more examples, workers skilled in the art will recognize that changes may be made in form and detail without departing from the scope of the disclosure and/or the appended claims.

What is claimed is:

1. A banking server in charge of managing a transaction involving an electronic card, wherein said electronic card is paired with at least one mobile terminal, and wherein said banking server includes:
   a computer-readable medium for recording an identifier of said mobile terminal, a location of said mobile terminal and a time of said location, among data relating to the owner of said electronic card; and
   a processor configured by program code instructions to:
      receive from each of at least some of a plurality of respective transaction devices at least one signal sent by the respective transaction device in response to the mobile terminal being in proximity to the respective transaction device and a communication being initiated between the mobile terminal and the respective transaction device, the at least one signal including a message containing said identifier of said mobile terminal, an identifier of said transaction device, time information, at least one bank reference information element, and at least one addressing information element designating at least one remote banking organization, wherein the time information enables the banking server to determine the time of said location when said mobile terminal is in proximity to said respective transaction device, said plurality of transaction devices comprising a transaction device making the transaction involving the electronic card and other transaction devices not making the transaction;
      update the location of said mobile terminal and the time of said location for said mobile terminal in response to the signals received from the respective transaction devices, including those transaction devices not making the transaction;
      receive information regarding the transaction involving said electronic card from the transaction device making the transaction during a time when communication with the mobile terminal is unavailable;
      determine a distance between a position of said mobile terminal and said transaction device making the transaction using the updated location of said mobile terminal and the time of said location;
      mark said transaction as suspicious if said distance is greater than a predetermined threshold;
      emit an alert to said owner of said card, if said transaction is marked as suspicious; and
      process said transaction, even if said transaction is marked as "suspicious".

2. A non-transitory computer-readable medium comprising program code instructions for implementing a method for securing a transaction, wherein an electronic card is paired with at least one mobile terminal, wherein at least one remote banking organization in charge of managing transactions involving said card has previously recorded an identifier of said mobile terminal among data relating to the owner of said card, when the program is executed on a bank server, wherein the method comprises:
   recording a location of said mobile terminal and a time of said location;
   receiving from each of at least some of a plurality of respective transaction devices at least one signal sent by the respective transaction device in response to the mobile terminal being in proximity to the respective transaction device and a communication being initiated between the mobile terminal and the respective transaction device, the at least one signal including a message containing said identifier of said mobile terminal, an identifier of said transaction device, time information, at least one bank reference information element, and at least one addressing information element designating said at least one remote banking organization, wherein the time information enables the banking server to determine the time of said location when said mobile terminal is in proximity to said respective transaction device, said plurality of transaction devices comprising a transaction device making the transaction involving the electronic card and other transaction devices not making the transaction;
   updating the location of said mobile terminal and the time of said location for said mobile terminal in response to the signals received from the respective transaction devices, including those transaction devices not making the transaction;
   receiving information regarding the transaction involving said electronic card from the transaction device making the transaction during a time when communication with the mobile terminal is unavailable;
   determining a distance between a position of said mobile terminal and said transaction device making the transaction using the updated location of said mobile terminal and the time of said location;
   marking said transaction as suspicious if said distance is greater than a predetermined threshold;
   emitting an alert to the attention of said owner of said card, if said transaction is marked as suspicious; and
   processing said transaction, even if said transaction is marked as "suspicious".

3. A method for securing a transaction by an electronic card, wherein said electronic card is paired with at least one mobile terminal, wherein at least one remote banking organization in charge of managing transactions involving said card has previously recorded an identifier of said mobile terminal among data relating to the owner of said card, and wherein said method includes the following acts:
   recording, by a control server of said at least one banking organization, a location of said mobile terminal and a time of said location;
   performing the following acts for each of at least some of a plurality of respective transaction devices, in response to the mobile terminal being in proximity to the respective transaction device, wherein the plurality of transaction devices comprises a transaction device making the transaction involving the electronic card and other transaction devices not making the transaction:
      initiating a communication between the mobile terminal and the respective transaction device;
      transmitting, by said mobile terminal, at least one first signal including a message containing said identifier of said mobile terminal, at least one bank reference information element, and at least one addressing information element designating said at least one remote banking organization;
      receiving, by the respective transaction device near said mobile terminal, said first signal;
      transmitting, by said transaction device, a second signal to said banking organization, the second signal including the identifier of said mobile terminal, an identifier of the respective transaction device, time information, at least one bank reference information element, and the at least one addressing information element designating the at least one remote banking organization;

receiving the second signal, by the control server of said at least one banking organization, wherein the time information enables the control server to determine the time of said location when said mobile terminal is in proximity to said respective transaction device; and updating the location of said mobile terminal and the time of said location for said mobile terminal in response to the received second signal;

receiving, by the control server, information regarding the transaction involving said electronic card from the transaction device making the transaction during a time when communication with the mobile terminal is unavailable;

determining, by the control server, a distance between a position of said mobile terminal and said transaction device making the transaction using the updated location of said mobile terminal and the time of said location;

marking said transaction as "suspicious" if said distance is greater than a predetermined threshold; and emitting an alert by said banking organization to said owner of said card, if said transaction is marked as "suspicious", processing said transaction, even if said transaction is marked as "suspicious".

4. The method for securing a transaction according to claim 3, wherein said predetermined threshold is dependent on the time that has passed since said recorded time of said location of the mobile terminal.

5. The method for securing a transaction according to claim 3, wherein said first signal is transmitted according to a communication technique belonging to the group including:

"Bluetooth" technology;

"Wi-Fi" technology;

"RFID" technology;

"NFC" ("Near Field Communication") technology;

infrared technology.

* * * * *